(12) United States Patent
Harada et al.

(10) Patent No.: US 8,750,762 B2
(45) Date of Patent: Jun. 10, 2014

(54) CHARGING MEMBER WITH VULCANIZED RUBBER, AND ELECTROPHOTOGRAPHIC APPARATUS INCLUDING THE CHARGING MEMBER

(75) Inventors: Masaaki Harada, Mishima (JP); Hiroaki Watanabe, Odawara (JP); Keiji Nose, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/028,129

(22) Filed: Feb. 15, 2011

(65) Prior Publication Data

US 2011/0176833 A1 Jul. 21, 2011

Related U.S. Application Data

(63) Continuation of application No. PCT/JP2010/006040, filed on Oct. 8, 2010.

(30) Foreign Application Priority Data

Oct. 15, 2009 (JP) ................................. 2009-238094

(51) Int. Cl.
*G03G 15/02* (2006.01)

(52) U.S. Cl.
USPC .................. 399/176; 492/53; 492/56; 492/59; 430/902; 524/572; 525/280; 525/331.9; 525/332.8; 525/332.9; 525/333.1; 525/333.2; 525/359.5; 525/359.6; 525/418; 525/437; 526/180; 528/271; 528/272

(58) Field of Classification Search
USPC ................................................ 399/174, 176
See application file for complete search history.

(56) References Cited

U.S. PATENT DOCUMENTS

| 4,550,142 A * | 10/1985 | Akita et al. .................... 525/236 |
| 4,848,511 A * | 7/1989 | Ohyama et al. ............... 180/312 |
| 5,393,467 A | 2/1995 | Yabushita et al. |
| 6,133,388 A * | 10/2000 | Lee et al. ....................... 526/180 |
| 7,366,448 B2 * | 4/2008 | Taniguchi et al. ............. 399/176 |

(Continued)

FOREIGN PATENT DOCUMENTS

| CN | 101354564 A | 1/2009 |
| EP | 1 036 803 A2 | 9/2000 |

(Continued)

OTHER PUBLICATIONS

English translation of Japanese patent document Awane et al. (JP 60-094433 A).*

(Continued)

*Primary Examiner* — David Gray
*Assistant Examiner* — Geoffrey Evans
(74) *Attorney, Agent, or Firm* — Fitzpatrick, Cella, Harper and Scinto

(57) ABSTRACT

To provide a charging member that can have a uniform electrical resistance, can not easily change in electrical resistance even by any long-term continuous electrification and, as a result thereof, may cause less change in its charging performance with time. A charging member having a conductive support and an elastic-material layer; the elastic-material layer comprising a vulcanized rubber; the vulcanized rubber being a vulcanized product of a composition which comprises i) a binder polymer comprising a polymer having a butadiene skeleton and ii) carbon black as electrically conductive particles; and the polymer having a butadiene skeleton has a molecular terminal modified with an atomic group having a specific structure.

4 Claims, 4 Drawing Sheets

(56) References Cited

U.S. PATENT DOCUMENTS

| | | |
|---|---|---|
| 7,486,911 B2 | 2/2009 | Harada |
| 7,638,590 B2 * | 12/2009 | Fukui et al. .................. 528/272 |
| 7,718,337 B2 * | 5/2010 | Kumano ......................... 430/96 |
| 8,148,045 B2 * | 4/2012 | Murata et al. .............. 430/270.1 |
| 8,491,994 B2 * | 7/2013 | Harada et al. ................. 428/323 |
| 2010/0080611 A1 * | 4/2010 | Kurachi et al. ............... 399/111 |
| 2011/0200356 A1 * | 8/2011 | Watanabe et al. ............. 399/111 |
| 2012/0076539 A1 * | 3/2012 | Sato et al. ................... 399/174 |
| 2012/0082852 A1 * | 4/2012 | Nose et al. ................. 428/411.1 |
| 2012/0141161 A1 * | 6/2012 | Watanabe et al. ............. 399/111 |
| 2012/0224887 A1 * | 9/2012 | Harada et al. ................. 399/168 |

FOREIGN PATENT DOCUMENTS

| | | |
|---|---|---|
| JP | 6-49103 A | 2/1994 |
| JP | 7-164571 A | 6/1995 |
| JP | 8-292625 A | 11/1996 |
| JP | 9-127760 A | 5/1997 |
| JP | 2004-101958 A | 4/2004 |
| JP | 2007-101603 A | 4/2007 |
| JP | 2007-292298 A | 11/2007 |

OTHER PUBLICATIONS

PCT International Search Report and Written Opinion of the International Searching Authority, International Application No. PCT/JP2010/006040, Mailing Date Nov. 2, 2010.

A Journal of the Society of Rubber Industry, vol. 62, No. 10, 1989, pp. 630-640.

A Journal of the Society of Rubber Industry, vol. 62, No. 10, 1989, pp. 630-640 (with partial translation).

Nagata, "Dynamic Mechanical Properties of Elastomers with Chemically Modified Chain-Ends", A Journal of the Society of Rubber Industry, vol. 62, No. 10, 1989, pp. 630-640 (with complete translation).

English translation of International Preliminary Report on Patentability, International Application No. PCT/JP2010/006040, Mailing Date May 24, 2012.

European Search Report dated Jul. 2, 2013 in European Application No. 10823184.6.

Chinese Office Action dated Mar. 19, 2014 in Chinese Application No. 201080044921.8.

* cited by examiner

CHARGING MEMBER WITH VULCANIZED RUBBER, AND ELECTROPHOTOGRAPHIC APPARATUS INCLUDING THE CHARGING MEMBER

CROSS-REFERENCE TO RELATED APPLICATIONS

This application is a continuation of International Application No. PCT/JP2010/006040, filed Oct. 8, 2010, which claims the benefit of Japanese Patent Application No. 2009-238094, filed Oct. 15, 2009.

BACKGROUND OF THE INVENTION

1. Field of the Invention

This invention relates to a charging member and an electrophotographic apparatus.

2. Description of the Related Art

In order to provide an electrical conductivity of approximately from $1 \times 10^3$ to $1 \times 10^7$ Ω·cm in volume resistivity to an elastic-material layer of a charging roller used in a contact charging system, it is known to form the elastic-material layer by using an electro-conductivity type conductive rubber composition compounded with electrically conductive particles such as carbon black. However, such an elastic-material layer has, as disclosed in Japanese Patent Application Laid-open No. 2007-292298, a problem that its electrical resistance heavily depends on the state of dispersion of the electrically conductive particles, and therefore electrical resistance non-uniformity in the charging roller may become large. Also, there is a case that in the charging member having such an elastic-material layer, an aggregation of the electrically conductive particles in the elastic-material layer is accelerated by the continuous application of direct-current voltage, and electrical resistance of the elastic-material layer is changed over time. Then, Japanese Patent Application Laid-open No. 2007-292298 discloses that it is attempted to resolve such a problem by employing the step of dispersing the electrically conductive particles in a conductive coat layer forming material by agitating these by means of a bead mill.

SUMMARY OF INVENTION

The present inventors have confirmed that the invention according to Japanese Patent Application Laid-open No. 2007-292298 is effective in resolving the above problem. However, in order to achieve a further restraint of the change in the electrical resistance with the use of the charging member, they have realized that further technical development must be made. Accordingly, the present inventors have made studies so that the above problem can be resolved in an aspect of materials. As the result, they have found that it is very effective in resolving the above problem to use in a binder polymer a polybutadiene having a specific terminal-modified group.

The present invention is directed to provide a charging member that can have a uniform electrical resistance, can not easily change in electrical resistance even by any long-term continuous electrification and, as a result thereof, may cause less change in its charging performance with time. The present invention is also directed to provide an electrophotographic apparatus that can form high-grade electrophotographic images stably.

According to one aspect of the present invention, there is provided a charging member comprising a conductive support and an elastic-material layer, wherein the elastic-material layer comprises a vulcanized rubber, and the vulcanized rubber is a vulcanized product of a composition which comprises i) a binder polymer comprising a polymer having a butadiene skeleton and ii) carbon black as an electrically conductive particle, wherein the polymer having a butadiene skeleton has a molecular terminal modified with an atomic group represented by the following general formula (1) or (2).

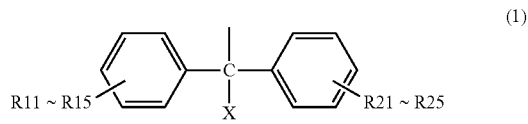

In the general formula (1), X represents OH or SH, and R11 to R15 and R21 to R25 each independently represent a hydrogen atom or a monovalent substituent.

In the general formula (2), Y represents OH or SH, and R3 to R5 each represent a hydrogen atom or a monovalent substituent.

According to another aspect of the present invention, there is provided an electrophotographic apparatus comprising the above charging member and an electrophotographic photosensitive member disposed in contact with the charging member.

According to the present invention, there is provided a charging member whose electrical resistance is hard to change even when long-term continuous electrification has been maintained and, as a result of that, the over time change in the charging performance is better restrained, and the non-uniformity is hard to happen.

According to the present invention, there is provided an electrophotographic apparatus which can provide high-grade electrophotographic images stably.

DESCRIPTION OF EMBODIMENTS

Preferred embodiments of the present invention are described below.

Figure 2:
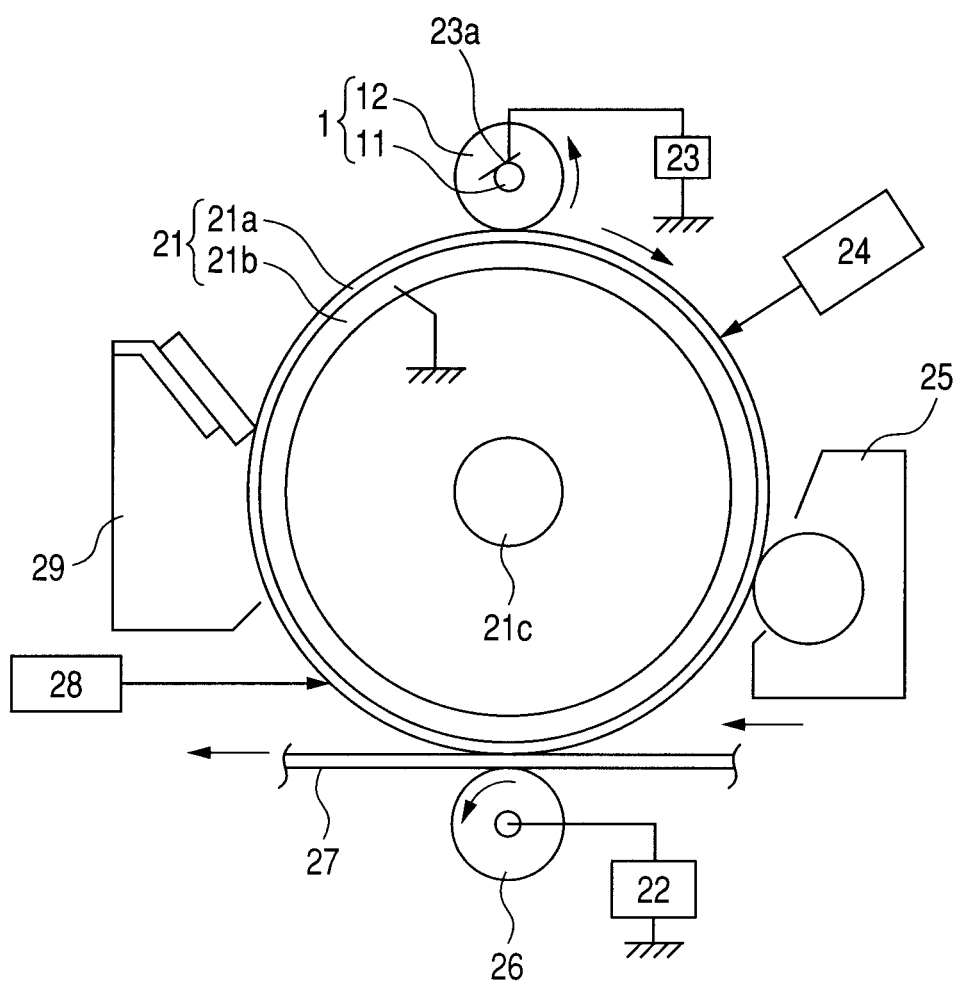
FIG. 2 is a schematic view showing the construction of an electrophotographic apparatus having a charging member.

FIG. 2 schematically shows the construction of an electrophotographic apparatus having a charging roller. A drum-shaped electrophotographic photosensitive member 21 shown in FIG. 2 which serves as a charging object member has, as basic constituent layers, a support 21b having conductivity, made of aluminum or the like and, formed on the support 21b, a photosensitive layer 21a. It is rotationally driven around a shaft 21c in the clockwise direction as viewed on FIG. 2, at a stated peripheral speed.

A charging roller 1 is a roller which is disposed in contact with the electrophotographic photosensitive member 21 and charges (primarily charges) the electrophotographic photosensitive member 21 to a stated polarity and potential. The charging roller 1 consists basically of a mandrel 11 and an elastic layer 12 formed on the mandrel 11. It is kept pressed against the electrophotographic photosensitive member 21 under application of pressure at both end portions of the mandrel 11 by means of a press-down means (not shown), and is follow-up rotated as the electrophotographic photosensitive member 21 is rotationally driven.

A stated direct-current (DC) bias is applied to the mandrel 21 through a rubbing-friction electrode 23a connected to a power source 23, whereupon the electrophotographic photosensitive member 21 is contact-charged to a stated polarity and potential. The electrophotographic photosensitive member 21 the peripheral surface of which has uniformly been charged by means of the charging roller 1 is subsequently subjected to exposure (e.g., laser beam scanning exposure, or slit exposure of images of an original) of intended image information by means of an exposure means 24, whereupon electrostatic latent images corresponding to the intended image information are formed on the peripheral surface of the electrophotographic photosensitive member 21.

The electrostatic latent images are then successively developed into visible images as toner images by a developing means 25. The toner images thus formed are then successively transferred by a transfer means 26 to a transfer material 27 having been transported from a paper feed means section (not shown) to a transfer zone between the electrophotographic photosensitive member 21 and the transfer means 26 at proper timing in the manner synchronized with the rotation of the electrophotographic photosensitive member 21. The transfer means 26 shown in FIG. 2 is a transfer roller, which is charged to a polarity reverse to that of toner from the back of the transfer material 27, whereupon the toner images on the side of the electrophotographic photosensitive member 21 are transferred on to the transfer material 27.

The transfer material 27 to which the toner images have been transferred is separated from the electrophotographic photosensitive member 21 and then transported to a fixing means (not shown), where the toner images are fixed. The transfer material with fixed images is put out as an image-formed matter. Instead, where images are also formed on the back, the transfer material with fixed images is transported to a means for re transporting it to the transfer zone.

The peripheral surface of the electrophotographic photosensitive member 21 from which the toner images have been transferred is subjected to pre-exposure by a pre-exposure means, whereby electric charges remaining on the electrophotographic photosensitive member 21 are removed (destaticized). As this pre-exposure means, any known means may be used, which may preferably be exemplified by an LED chip array, a fuse lamp, a halogen lamp and a fluorescent lamp.

The peripheral surface of the electrophotographic photosensitive member 21 thus destaticized is cleaned by a cleaning means 29 to remove any adherent contaminants such as transfer residual toner. Its surface having been thus cleaned is repeatedly used for image formation.

The charging roller 1 may be follow-up driven to the electrophotographic photosensitive member 21 which is driven with surface movement, or may be set unrotatable, or may be positively rotationally driven at a stated peripheral speed in the forward direction or backward direction with respect to the direction of the surface movement of the electrophotographic photosensitive member 21.

The exposure is performed using light reflected from, or transmitted through, an original, or by the scanning of a laser beam, the driving of an LED array or the driving of a liquid crystal shutter array according to signals obtained by reading an original and converting the information into signals.

The electrophotographic photosensitive member in which the charging member of the present invention is usable may include copying machines, laser beam printers and LED printers, or apparatus where electrophotography is applied, such as electrophotographic platemaking systems.

The charging member of the present invention may be used as, besides the charging roller, a developing member, a transfer member, a charge elimination (destaticizing) member, and a transport member such as a paper feed roller.

Figure 1:
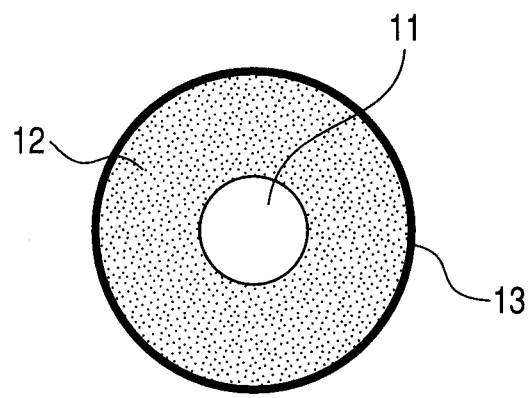
FIG. 1 is a diagrammatic sectional view showing the construction of a charging roller.

The charging member according to the present invention is so set up that a semiconductive elastic-material layer is superposedly formed on a conductive support. A diagrammatic sectional view of a charging roller 1 is shown in FIG. 1, as an example of the charging member of the present invention. The charging roller 1 is constituted of a mandrel 11 and provided on its peripheral surface an elastic-material layer 12. A surface layer 13 may also optionally be provided on the outer side of the elastic-material layer 12.

The elastic-material layer contains a vulcanized rubber. The vulcanized rubber is a vulcanized product of a composition which contains i) a binder polymer containing a polymer having a butadiene skeleton and ii) carbon black as electrically conductive particles, having been dispersed in the binder polymer.

Then, the polymer having a butadiene skeleton has been modified at a molecular terminal thereof with an atomic group represented by the following general formula (1) or (2).

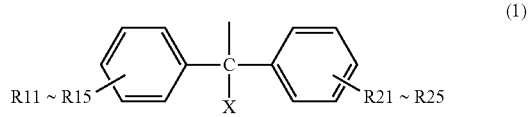

(1)

In the general formula (1), X represents OH or SH, and R11 to R15 and R21 to R25 each independently represent a hydrogen atom or a monovalent substituent.

(2)

In the general formula (2), Y represents OH or SH, and R3 to R5 each represent a hydrogen atom or a monovalent substituent.

In particular, the polymer having a butadiene skeleton according to the present invention may be one having been modified at a molecular terminal thereof with an atomic group represented by the following formula (5) or (6).

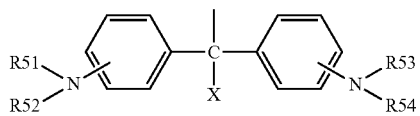

Formula (5)

(In the formula (5), R51 to R54 each independently represent a hydrogen atom or an alkyl group having 1 to 4 carbon atom(s), and X represents OH or SH.)

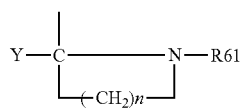

Formula (6)

(In the formula (6), Y represents OH or SH, R61 represents a hydrogen atom, an alkyl group having 1 to 6 carbon atom(s) or a phenyl group, and n represents an integer of 2 to 6.)

Figure 4:
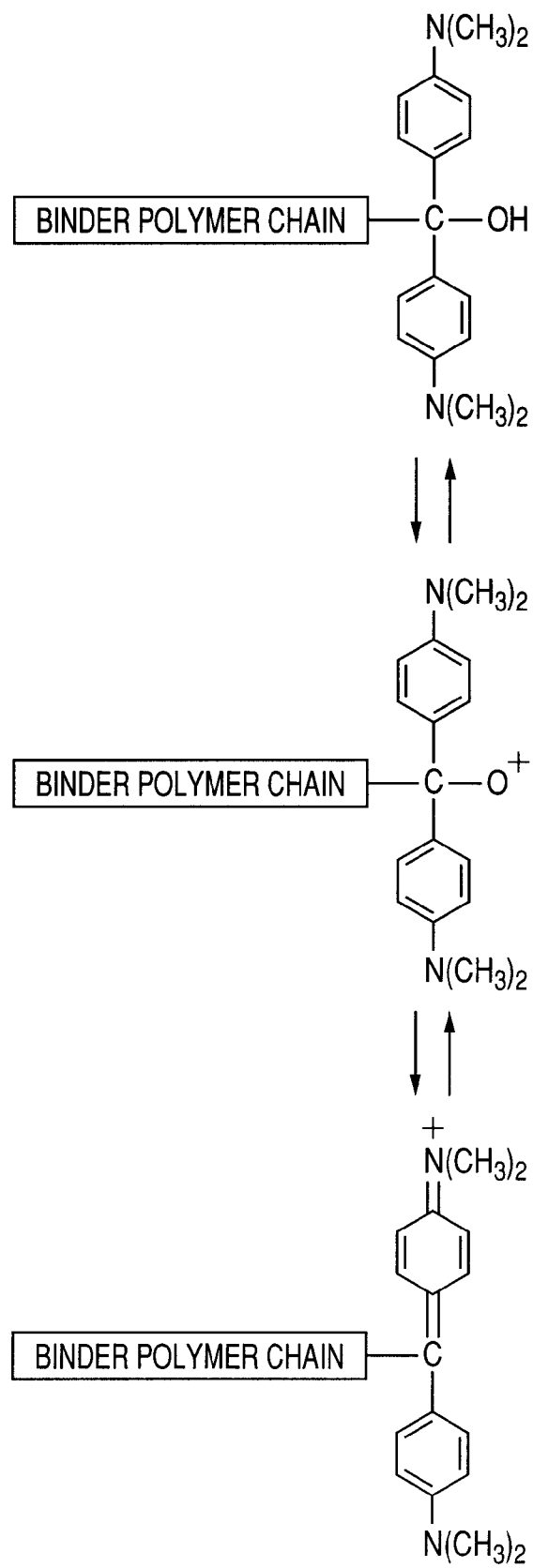
FIG. 4 is an illustration of the mechanism of forming a cation on a terminal-modified group derived from benzophenone.
Figure 5:
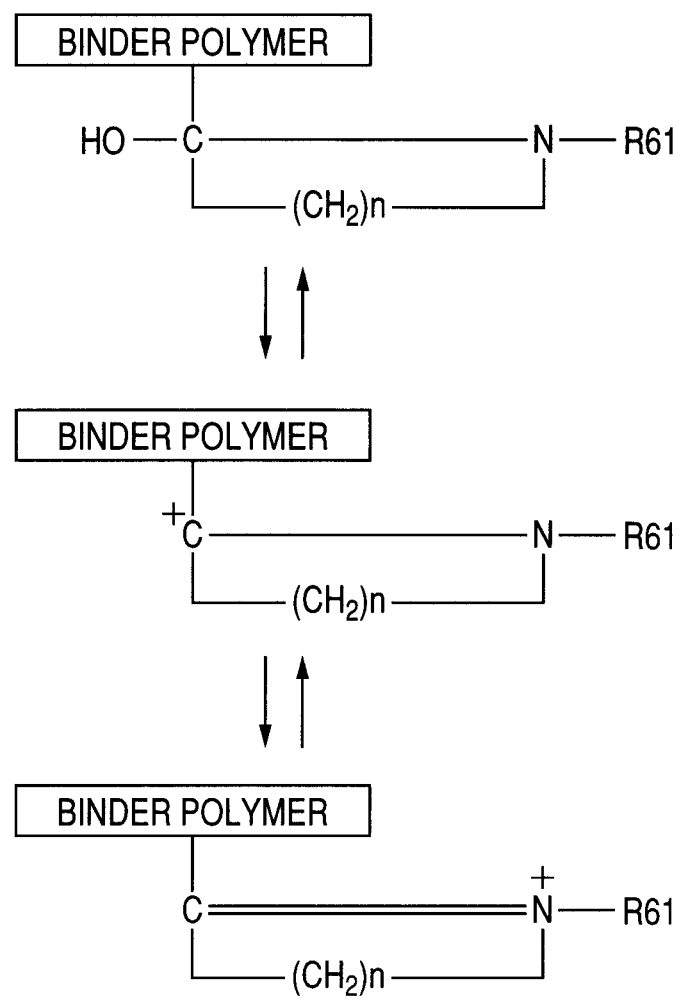
FIG. 5 is an illustration of the mechanism of forming a cation on a terminal-modified group derived from a lactam.

The polymer having a butadiene skeleton and having been modified at a molecular terminal thereof with the atomic group represented by the formula (1) or (2) or the formula (5) or (6) is considered to allow a cation (iminium ion) to come at the terminal-modified group moiety (see FIGS. 4 and 5) on account of the heat or the like produced when it is kneaded with the carbon black. It is presumed that the cation having thus come thereat acts on a functional group such as quinone, hydroxyl, ester, carboxyl or ether present on carbon black particle surfaces to form a linkage between the carbon black and the binder polymer. Then, this linkage makes stable the state of dispersion of the carbon black in the binder polymer. Such a phenomenon itself is described also in "NIPPON GOMU KYOKAISHI" (a journal of The Society of Rubber industry, Japan), Volume 62, No. 10 (1989), page 635, paragraph 4.1.

Accordingly, it is considered that, in the elastic-material layer according to the present invention, the carbon black stands highly dispersed in a cross-linked rubber and also the cross-linked rubber and the carbon black have chemically been bonded. As the result, the position of the carbon black in the elastic-material layer can not easily vary even where the charging member has been kept to stand electrified over a long period of time, and hence any local non-uniformity of electrical resistance can not easily to come about, as so considered.

The polymer having a butadiene skeleton and having been modified at its terminal may be produced by a method which may include, e.g., the following:

(a) A method in which the polymer having a butadiene skeleton is synthesized in the presence of an alkali metal and/or alkaline earth metal catalyst(s), and thereafter a modifying agent is added to the resultant polymer solution to carry out reaction; and (b) a method in which the polymer having a butadiene skeleton that has beforehand been formed by polymerization is dissolved in a solvent, and thereafter an alkali metal and/or alkaline earth metal catalyst(s) is/are added to the polymer thus dissolved, where a modifying agent is added thereto to carry out reaction.

The former method is preferred because the synthesis of the polymer having a butadiene skeleton and the modification of its terminal can continuously be carried out.

The polymer to be modified at its terminal may include polybutadiene obtained by polymerizing a 1,3-butadiene monomer, and copolymers of any of 1,3-butadiene, isoprene, 1,3-pentadiene, 2,3-dimethyl-1,3-butadiene, 1,3-hexadiene, styrene, α-methylstyrene, p-methylstyrene, vinyltoluene, vinylnaphthalene and so forth. Such a polymer, as having the butadiene skeleton in its backbone chain, can be vulcanized with sulfur, and hence a charging member is obtained which can enjoy a high vulcanization productivity. As a preferred polymer, it is polybutadiene or a styrene-butadiene copolymer.

Specific examples of a terminal-modifying agent with which the atomic group of the general formula (1) is introduced in the polymer terminal are given below: 4-Aminobenzopheneone, 4-dimethylaminobenzopheneone, 4-dimethylamino-4'-methylbenzopheneone, 4,4'-diaminobenzopheneone, 4,4'-bis(dimethylamino)benzopheneone, 4,4'-bis(diethylamino)benzopheneone, 4,4'-bis(ethylamino)benzopheneone, 3,3'-dimethyl-4,4'-bis(diethylamino)benzopheneone, 3,3'-dimethoxy-4,4'-bis(dimethylamino)benzopheneone, 3,3',5,5'-tetraminobenzopheneone, 2,4,6-triaminobenzopheneone, 3,3',5,5'-tetra(diethylamino)benzopheneone, and thiobenzopheneones corresponding to these.

In particular, bisaminobenzopheneones represented by the following formulas (1-1) to (1-3) may preferably be used. This is because a charging member can be obtained which much less may change in electrical resistance even by any long-time electrification.

Formula (1-1): 4,4'-diaminobenzopheneone

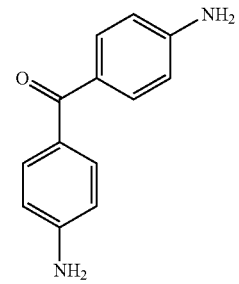 [SMILES: Nc1ccc(C(=O)c2ccc(N)cc2)cc1]

Formula (1-2): 4,4'-bis(dimethylamino)benzopheneone

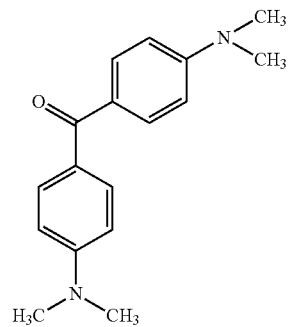 [SMILES: CN(C)c1ccc(C(=O)c2ccc(N(C)C)cc2)cc1]

Formula (1-3): 4,4'-bis(diethylamino)benzopheneone

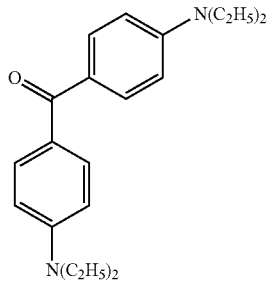

Specific examples of the terminal-modifying agent with which the atomic group of the general formula (2) is introduced in the polymer terminal are given below:

Amides or imides (e.g., formamide, N,N-dimethyl formamide, N,N-diethyl formamide, acetamide, N,N-dimethyl acetamide, N,N-diethyl acetamide, aminoacetamide, N,N-dimethyl-N',N'-dimethyl aminoacetamide, N',N'-dimethyl acetamide, N'-ethyl aminoacetamide, N,N-dimethyl-N'-ethyl aminoacetamide, N,N-dimethyl aminoacetamide, N-phenyl diacetamide, acrylamide, N,N-dimethyl acrylamide, N,N-dimethyl methacrylamide, propionamide, N,N-dimethyl propionamide, 4-pyridylamide, N,N-dimethyl 4-pyridylamide, benzamide, N-ethyl benzamide, N-phenyl benzamide, N,N-dimethyl benzamide, p-aminobenzamide, N',N'-(p-dimethylamino)benzamide, N',N'-(p-diethylamino)benzamide, N'-(p-methylamino)benzamide, N'-(p-ethylamino)benzamide, N,N-dimethyl-N'-(p-ethylamino)benzamide, N,N-dimethyl-N',N'-(p-diethylamino) benzamide, N,N-dimethyl-p-aminobenzamide, N-methyldibenzamide, N-acetyl-N-2-naphthyl benzamide, succinic acid amide, maleic acid amide, phthalic acid amide, N,N,N',N'-tetramethylmaleic acid amide, tetramethylphthalic acid amide, succinimide, N-methyl succinimide, maleimide, N-methyl maleimide, phthalimide, N-methyl phthalimide, oxamide, N,N,N',N'-tetramethyl oxamide, N,N-dimethyl-p-amino-benzal acetamide, nicotinamide, N,N-diethyl nicotinamide, 1,2-cyclohexane dicarboximide, N-methyl-1,2-cyclohexane dicarboximide, methyl carbamate, N-methyl methyl carbamate, N,N-diethyl ethyl carbanylate, and p-N,N-diethyl ethyl aminocarbanylate);

ureas (e.g., urea, N,N-dimethylurea, and N,N,N',N'-tetramethylurea);

anilides (e.g., formanilide, N-methyl acetanilide, aminoacetanilide, benzanilide, and p,p'-di(N,N-diethyl)aminobenzanilide);

lactams (e.g., ε-caprolactam, N-methyl-ε-caprolactam, N-acetyl-ε-caprolactam, 2-pyyrolidone, N-methyl-2-pyyrolidone, N-acetyl-2-pyyrolidone, 2-piperidone, N-methyl-2-piperidone, 2-quinolone, N-methyl-2-quinolone, 2-indolinone, and N-methyl-2-indolinone); and isocyanuric acids (e.g., isocyanuric acid, and N,N',N''-trimethylisocyanuric acid.

The above terminal-modifying agent may also include sulfur-containing compounds corresponding to the above various compounds.

In the present invention, lactams such as those represented by the following formulas (2-1) to (2-9) may particularly preferably be used. This is because a charging member can be obtained which much less may change in electrical resistance even by any long-time electrification. As a reason therefore, the present inventors consider it as stated below. That is, when the binder polymer having such a terminal-modified group derived from a lactam is kneaded together with the carbon black, a cation comes at the terminal-modified moiety. This is what has been shown in FIG. 5. Here, where any of the lactams represented by the following formulas (2-1) to (2-9) is used as the terminal-modifying agent, the feature that a lower alkyl group having 1 to 4 carbon atom(s) or a phenyl group is bonded to the nitrogen atom has made the cation more easily come at the terminal modified moiety.

Formula (2-1): N-methyl-β-propiolactam

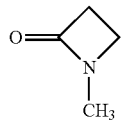

Formula (2-2): N-phenyl-β-propiolactam

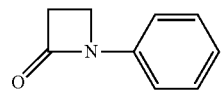 [SMILES: O=C1CCN1c1ccccc1]

Formula (2-3): N-methyl-2-pyyrolidone

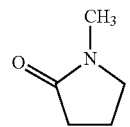

Formula (2-4): N-phenyl-2-pyyrolidone

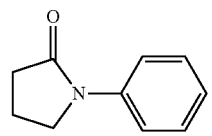 [SMILES: O=C1CCCN1c1ccccc1]

Formula (2-5): N-t-butyl-2-pyyrolidone

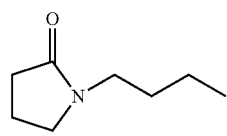

Formula (2-6): N-methyl-2-piperidone

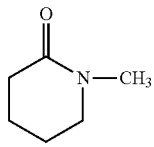

Formula (2-7): N-phenyl-2-piperidone

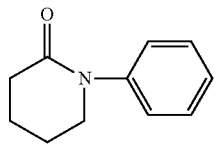 [SMILES: O=C1CCCCN1c1ccccc1]

Formula (2-8): N-methyl-c-caprolactam

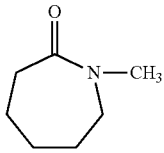

Formula (2-9): N-methyl-ε-caprolactam

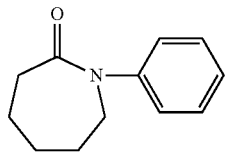 [SMILES: O=C1CCCCCN1c1ccccc1]

The composition used to form the elastic-material layer may be incorporated with, in addition to the polymer modified at its terminal, any other binder polymer by blending. Examples of what may be used as the other binder polymer are given below: Natural rubber (NR), isoprene rubber (IR), butadiene rubber (BR), styrene-butadiene rubber (SBR), butyl rubber (IIR), an ethylene-propylene-diene terpolymer rubber (EPDM), an epichlorohydrin homopolymer (CHC), an epichlorohydrin-ethylene oxide copolymer (CHR), an epichlorohydrin-ethylene oxide-acrylic glycidyl ether terpolymer (CHR-AGE), an acrylonitrile-butadiene copolymer (NBR), a hydrogenated product of acrylonitrile-butadiene copolymer (H-NBR), chloroprene rubber (CR), acrylic rubbers (ACM, ANM) and so forth.

The composition used to form the elastic-material layer contains the carbon black as electrically conductive particles in order to make the elastic-material layer electrically conductive. The carbon black may be compounded in such an amount that is appropriately so controlled that the electrical resistance of the elastic-material layer may be the desired value. Thus, the carbon black may be compounded in an amount of, stated roughly, from 30 parts by mass or more to 70 parts by mass or less, based on 100 parts by mass of the binder polymer. As long as it is compounded in the amount within the above range, the elastic-material layer can more surely be kept from varying in its electrical resistance even where the charging member has been electrified over a long period of time. The elastic-material layer can also be kept from having too high hardness.

As types of the carbon black, there are no particular limitations thereon. Stated specifically, it may include gas furnace black, oil furnace black, thermal black, lamp black, acetylene black, and KETJEN black. Functional groups are present on the particle surfaces of the carbon black, and such functional groups combine with the molecular-terminal functional group represented by the general formula (1) or (2), whereby the linkage between the binder polymer and the carbon black is formed.

For the number of particle surface functional groups of the carbon black, the pH of carbon black that is measured according to DIN ISO 787/9 and the volatile component of carbon black that is measured according to DIN 53552 make an index. The smaller the pH value of carbon black is and also the larger the amount of its volatile component is, the more the particle surface functional groups of the carbon black are. If the carbon black has too large a number of particle surface functional groups, the points of linkage with the binder polymer may come too many on the carbon black particle surfaces, so that the elastic-material layer may have a large electrical resistance. If on the other hand the carbon black has too small a number of particle surface functional groups, the linkage between the binder polymer and the carbon black may be so weak as to be insufficiently effective in keeping any deterioration from being caused by electrification. Hence, the carbon black may preferably have a pH of from 3 to 9, and much preferably from 5 to 8. The carbon black may also preferably have a volatile component in an amount of from 0.3 wt. % to 5.0 wt. %, and much preferably from 0.5 wt. % to 2.0 wt. %.

In addition, to the composition used to form the elastic-material layer, a filler, an aid agent for processing, a cross-linking auxiliary agent, a cross-linking accelerator, a cross-linking accelerator activator, a cross-linking retarder, a softening agent, a plasticizer, a dispersant and so forth may optionally be added which are commonly used as compounding agents for rubbers.

As methods for mixing these raw materials, they may be exemplified by a mixing method making use of a closed mixing machine such as Banbury mixer or a pressure kneader and a mixing method making use of an open mixing machine such as an open roll.

As methods for forming the elastic-material layer, they may include the following methods.

Method 1:
The composition containing the binder polymer according to the present invention and the carbon black as electrically conductive particles is extruded in the shape of a tube by means of an extruder and this extruded product is vulcanized by means of a vulcanizing pan to obtain a tube composed of vulcanized rubber. The mandrel is press-fitted into this tube and also the surface of the tube composed of vulcanized rubber is sanded to give the desired outer diameter.

Method 2:
The composition containing the binder polymer according to the present invention and the carbon black as electrically conductive particles is co-extruded into a cylindrical shape setting the mandrel at the center, by means of an extruder fitted with a cross-head, and fixed to the interior of a mold having the desired outer diameter, followed by heating to form around the mandrel an elastic-material layer composed of vulcanized rubber.

In order that any dirt such as toner and paper dust can not easily stick to the surface of the elastic-material layer, the surface of the elastic-material layer may be irradiated with ultraviolet rays or electron rays so as to be subjected to surface modification. Also, a surface layer may further be formed on the surface of the elastic-material layer.

EXAMPLES

The present invention is described below in greater detail by giving working examples. In the following, "part(s)" refers to "part(s) by mass" unless particularly noted. As reagents and the like, commercially available high-purity products are used unless particularly specified.

—Syntheses of Terminal-Modified Polymers—

Terminal-modified SBR-1

The internal atmosphere of an autoclave polymerization reactor having an inner volume of 15 liters and made of stainless steel was displaced with dry nitrogen, and thereafter 200 g of styrene, 800 g of 1,3-butadiene and 7,000 g of cyclohexane were fed thereinto. Next, 18 millimoles (based on magnesium) of a dibutylmagnesium/triethyl aluminum complex (molar ratio Mg/Al=5) and 4.0 millimoles of tertiary butoxybarium were added thereto, where, with stirring of the contents, polymerization was carried out at 60° C. for 5 hours. After the polymerization was completed, 10 millimoles of 4,4'-bis(diethylamino)benzophenenone [Formula (3)] was added as a terminal-modifying agent, and the reaction was carried out for 1 hour. After the reaction was completed, 5 ml of methanol was added to stop the reaction, and then the polymer solution obtained was taken out into a 1.5% by mass methanol solution of 2,6-di-t-butyl-p-cresol (BHT) to allow the polymer thus formed to coaguluate. Thereafter, this polymer was dried under reduced pressure at 60° C. for 24 hours to obtain a terminal-modified styrene-butadiene copolymer (Terminal-modified SBR-1).

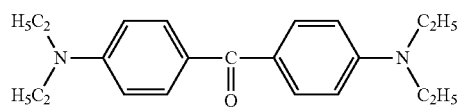

(3)

Terminal-Modified SBR-2

Terminal-modified SBR-2 was obtained in the same way as that for Terminal-modified SBR-1 except that N-methyl-ε-caprolactam [Formula (4)] was used as the terminal-modifying agent.

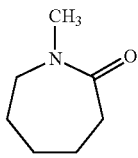

(4)

Unmodified SBR

Unmodified SBR was obtained in the same way as that for Terminal-modified SBR-1 except that any terminal-modifying agent was not added.

Terminal-Modified BR-1

The internal atmosphere of an autoclave polymerization reactor having an inner volume of 15 liters and made of stainless steel was displaced with dry nitrogen, and thereafter 1,000 g of 1,3-butadiene and 7,000 g of cyclohexane were fed thereinto. Next, 23 millimoles (based on magnesium) of a dibutylmagnesium/triethyl aluminum complex (molar ratio Mg/Al=5) and 5.6 millimoles of tertiary butoxybarium were added thereto, where, with stirring of the contents, polymerization was carried out at 60° C. for 5 hours. After the polymerization was completed, 10 millimoles of N-methyl-ε-caprolactam [Formula (4)] was added as a terminal-modifying agent, and the reaction was carried out for 1 hour. After the reaction was completed, 5 ml of methanol was added to stop the reaction, and then the polymer solution obtained was taken out into a 1.5% by mass methanol solution of 2,6-di-t-butyl-p-cresol (BHT) to allow the polymer thus formed to coaguluate. Thereafter, this polymer was dried under reduced pressure at 60° C. for hours to obtain a terminal-modified styrene-butadiene copolymer (Terminal-modified BR-1).

Unmodified BR

Unmodified BR was obtained in the same way as that for Terminal-modified BR-1 except that any terminal-modifying agent was not added.

Example 1

Preparation of Unvulcanized Rubber Composition

The following materials were mixed by means of a 3-liter pressure kneader for 16 minutes in a packing of 65 vol. % and at a number of blade revolutions of 30 rpm to obtain an unvulcanized rubber composition.

Terminal-modified SBR-1 (binder polymer) 100 parts
Zinc stearate (aid agent for processing) 1 part
Zinc oxide (vulcanization accelerator activator) 5 parts
Carbon black (electrically conductive particles) 50 parts
(trade name: TOKA BLACK #7400F; pH: 7.0; volatile component: 1.5 wt. %; available from Tokai Carbon Co., Ltd.)

Into 156 parts of this unvulcanized rubber composition, the following materials were mixed by means of an open roll of 12 inches in roll diameter, for 20 minutes at a number of front-roll revolutions of 8 rpm and a number of back-roll revolutions of 10 rpm and at a roll gap of 2 mm to obtain an unvulcanized rubber composition for elastic-material layer.

Sulfur (cross-linking agent) 1.2 parts
Tetramethylammonium monosulfide 1.0 part
(vulcanization accelerator; trade name: NOCCELLER TBzTD; available from Ohuchi-Shinko Chemical Industrial Co., Ltd.)
N-t-butyl-2-benzothiazole sulfenimide 1.0 part
(vulcanization accelerator; trade name: SUNTOCURE-TBSI; available from FLEXSYS)

Production of Charging Roller A

The unvulcanized rubber composition obtained was extruded in the shape of a tube by means of a vented rubber extruder (a vented extruder of 45 mm in diameter; L/D: 20; manufactured by Nakata Engineering Co., Ltd.). Thereafter, this extruded product was subjected to primary vulcanization at 160° C. for 30 minutes under power steam by means of a vulcanizing pan to obtain a rubber tube of 10 mm in outer diameter, 5.5 mm in inner diameter and 250 mm in length. Next, a columnar conductive mandrel (made of steel and plated with nickel on its surface) of 6 mm in diameter and 252 mm in length was coated with a conductive hot melt adhesive over the column surface on its middle portion of 232 mm in axial direction, followed by drying at 80° C. for 30 minutes. This mandrel coated with the adhesive was press-fitted into the above rubber tube, and then this was subjected to secondary vulcanization and bond treatment at 160° C. for 30 hours in a hot-air oven. The composite body obtained was cut off at its both end portions to produce an unsanded roller of 232 mm in length at its rubber portion. This unsanded roller was sanded at its rubber portion by means of a sander (trade name: LEO-600-F4-BME, manufactured by Minakuchi Machinery Works Ltd.) to obtain a rubber roller having a elastic-material layer, having a crown shape of 8.35 mm in end-portion diameter and 8.50 mm in middle-portion diameter. The rubber roller obtained was irradiated with ultraviolet rays on its surface to carry out surface modification treatment. This surface treatment was carried out by irradiating the surface with ultraviolet rays of 254 nm in wavelength in such a way that the integrated amount of light came to 8,500 mJ/cm$^2$, and a low-pressure mercury lamp manufactured by Harison Toshiba Lighting Corporation was used in the irradiation with ultraviolet rays. Thus, a charging roller A was produced.

Figure 3:
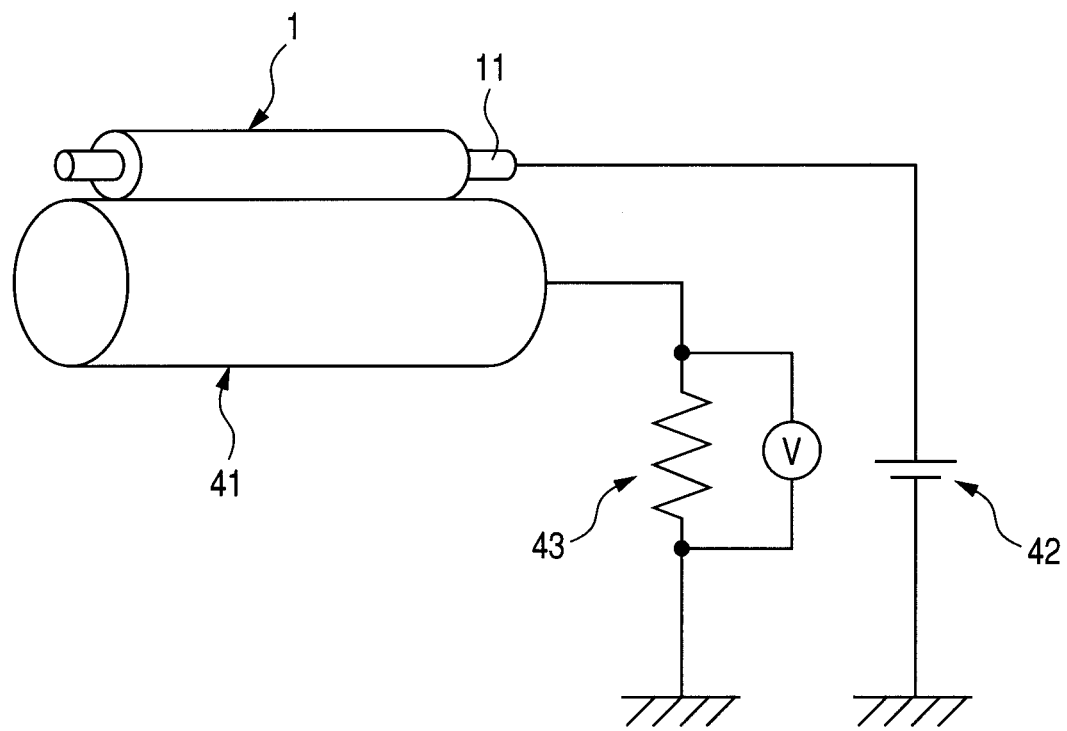
FIG. 3 is a schematic view showing the construction of an instrument with which the electrical resistance of a charging roller is measured.

Measurement of electrical resistance, peripheral non-uniformity of electrical resistance, environmental dependence, and electrification deterioration:

FIG. 3 schematically shows the construction of an instrument with which the electrical resistance of a charging roller is measured. A charging roller 1 is kept pressed against a cylindrical aluminum drum 41 under application of pressure at both end portions of a mandrel 11 by means of a press-down means (not shown), and is follow-up rotated as the aluminum drum 41 is rotatingly driven. In this state, a DC voltage is applied to the part of the mandrel 11 of the charging roller 1 by the use of an external power source 42, where the voltage applied to a standard resistance 43 connected to the aluminum drum 41 in series is measured. The electrical resistance of the charging roller 1 may be calculated by finding the value of electric current flowing through the circuit, from the voltage of the standard resistance 43, thus measured.

The electrical resistance of the charging roller A was measured under application of a DC voltage of 200 V across the mandrel and the aluminum drum for 2 seconds in an environment of temperature 23° C./humidity 50% RH (also noted as NN) and using the instrument shown in FIG. 3. In this measurement, the number of revolutions of the aluminum drum was 30 rpm, and the value of resistance of the standard resistance was 100 ohms. Data were sampled at a frequency of 20 Hz at intervals of 1 second after 1 second lapsed after the voltage was applied, and an average value of the electrical resistance values obtained was taken as the resistance value of the charging roller A. Also, the ratio of the maximum value to the minimum value of the electrical resistance values of the charging roller A, thus measured, was calculated as the peripheral non-uniformity of electrical resistance of the charging roller A.

Further, the above measurement of electrical resistance was also made in an environment of temperature 15° C./humidity 10% RH (also noted as LL) and in an environment of temperature 30° C./humidity 80% RH (also noted as HH). Then, the ratio of the electrical resistance of the charging roller A in the LL environment to that in the HH environment, LL/HH, was calculated as the environmental dependence of electrical resistance of the charging roller A.

The charging roller A was also tested on its any deterioration due to electrification. To test such electrification deterioration, the instrument shown in FIG. 3 was used, and, in the same way as the above measurement of electrical resistance, a DC voltage of 200 V was applied across the mandrel and the aluminum drum for 2 seconds to measure electrical resistance at the initial stage. In this measurement, the number of revolutions of the aluminum drum was 30 rpm, and the value of resistance of the standard resistance was 100 ohms. Next, while the aluminum drum was rotated at 30 rpm, a DC voltage of 200 V was applied across the mandrel and the aluminum drum for 10 seconds to cause the charging roller A to deteriorate due to electrification. After it had deteriorated due to electrification, the electrical resistance of the charging roller A having deteriorated due to electrification was again measured in the same way as the above measurement of the electrical resistance at the initial stage. Then, the value of electrical resistance of the charging roller A before electrification deterioration was divided by the value of electrical resistance of the charging roller A after electrification deterioration, where the value found was multiplied by 100 and the resultant value was taken as resistance retentivity (%).

As the result of these, the charging roller A was found to have an initial-stage roller resistance value of $6.7 \times 10^4$ ohms, a peripheral non-uniformity of 1.5 times, an environmental dependence of 1.1 times, and a resistance retentivity of 70% as a result of the electrification deterioration.

Measurement of Hardness:

The hardness of the charging roller A was measured with a microhardness meter MD-1 Model (trade name; manufactured by Koubunshi Keiki Co., Ltd.), and was measured in a peak hold mode in an environment of 23° C./55% RH. Stated more specifically, the charging roller A was placed on a plate made of a metal, and a block made of a metal was placed to simply fasten the charging roller A so as not to roll over, where a measuring terminal was pressed against the metal plate accurately at the center of the charging roller A in the vertical direction, where a value after 5 seconds was read. This was measured at both end portions positioned 30 to 40 mm away from rubber ends of the charging roller A and the middle portion thereof, and at 3 spots each in the peripheral direction, i.e., at 9 spots in total. An average value of the measured values obtained was taken as the hardness of the elastic-material layer. As the result, the charging roller A was found to have a hardness of 70°.

Image Evaluation:

The charging roller A produced (a member other than what was used to measure the electrical resistance and hardness) was set in an electrophotographic process cartridge, and this electrophotographic process cartridge was set in an electrophotographic apparatus (trade name: LBP 5050; manufactured by CANON INC.) for A4-size sheet lengthwise image reproduction to make image evaluation.

Images were reproduced in an environment of 15° C./10% RH. The images to be evaluated were halftone images on A4-size paper (images of lines of one-dot width which were drawn at two-dot intervals in the direction perpendicular to the rotational direction of the electrophotographic photosensitive member. The images reproduced were evaluated by visually observing the uniformity of halftone images at the time of one-sheet reproduction (initial stage) and that of halftone images reproduced after printing on 2,500 sheets at a print density of 1% (after running). From the images at the initial stage and after running, thus obtained, evaluation was made on any fine horizontal-line faulty images (horizontal lines attributable to charging) occurring because the charging member came to have a high resistance and any vertical-line faulty images occurring because the surface of the charging member came stained with toner and so forth, which were evaluated according to the following ranking.

A: A case in which any faulty image did not appear at all.
B: A case in which the above faulty images occurred very slightly.
C: A case in which the above faulty images occurred slightly.
D: A case in which the above faulty images occurred clearly.

As the result, the charging roller A was ranked as "A" for the horizontal lines attributable to charging about both the initial-stage images and the images after running, and ranked as "A" also about the evaluation on vertical-line faulty images after running.

Example 2

An unvulcanized rubber composition was prepared in the same way as in Example 1 except that the binder polymer was changed for the terminal-modified SBR-2. Then, a charging roller B was produced in the same way as in Example 1 except that the unvulcanized rubber composition thus obtained was used. About the charging roller B obtained, the electrical resistance, the peripheral non-uniformity of electrical resistance, the environmental dependence and the electrification deterioration were measured and also the hardness was measured, all in the same way as those in Example 1. As the result, the charging roller B was found to have an initial-stage roller resistance value of $8.0 \times 10^4$ ohms, a peripheral non-uniformity of 1.8 times, an environmental dependence of 1.1 times, a resistance retentivity of 77% as a result of the electrification deterioration, and a hardness of 72°. Image evaluation was also made in the same way as in Example 1 to find that the charging roller B was ranked as "A" for the horizontal lines attributable to charging about both the initial-stage images and the images after running, and ranked as "A" also about the evaluation on vertical-line faulty images after running.

Example 3

An unvulcanized rubber composition was prepared in the same way as in Example 1 except that the binder polymer was changed for the terminal-modified BR-1. Then, a charging roller C was produced in the same way as in Example 1 except that the unvulcanized rubber composition thus obtained was used. About the charging roller C obtained, the electrical resistance, the peripheral non-uniformity of electrical resistance, the environmental dependence and the electrification deterioration were measured and also the hardness was measured, all in the same way as those in Example 1. As the result, the charging roller C was found to have an initial-stage roller resistance value of $5.0 \times 10^4$ ohms, a peripheral non-uniformity of 1.7 times, an environmental dependence of 1.2 times, a resistance retentivity of 73% as a result of the electrification deterioration, and a hardness of 68°. Image evaluation was also made in the same way as in Example 1 to find that the charging roller C was ranked as "A" for the horizontal lines attributable to charging about both the initial-stage images and the images after running, and ranked as "A" also about the evaluation on vertical-line faulty images after running.

Example 4

An unvulcanized rubber composition was prepared in the same way as in Example 2 except that the conductive agent was changed for carbon black (trade name: TOKA BLACK #5500; available from Tokai Carbon Co., Ltd.; pH: 6.0; volatile component: 1.4 wt. %) and was compounded in an amount of 28 parts based on 100 parts of the binder polymer. Then, a charging roller D was produced in the same way as in Example 1 except that the unvulcanized rubber composition thus obtained was used. About the charging roller D obtained, the electrical resistance, the peripheral non-uniformity of electrical resistance, the environmental dependence and the electrification deterioration were measured and also the hardness was measured, all in the same way as those in Example 1. As the result, the charging roller D was found to have an initial-stage roller resistance value of $1.3 \times 10^5$ ohms, a peripheral non-uniformity of 1.9 times, an environmental dependence of 1.2 times, a resistance retentivity of 55% as a result of the electrification deterioration, and a hardness of 64°. Image evaluation was also made in the same way as in Example 1 to find that the charging roller D was ranked as "A" for the horizontal lines attributable to charging about the initial-stage images and "B" about the images after running, and ranked as "A" about the evaluation on vertical-line faulty images after running.

Example 5

An unvulcanized rubber composition was prepared in the same way as in Example 4 except that the carbon black was compounded in an amount of 30 parts based on 100 parts of the binder polymer. Then, a charging roller E was produced in the same way as in Example 1 except that the unvulcanized rubber composition thus obtained was used. About the charging roller E obtained, the electrical resistance, the peripheral non-uniformity of electrical resistance, the environmental dependence and the electrification deterioration were measured and also the hardness was measured, all in the same way as those in Example 1. As the result, the charging roller E was found to have an initial-stage roller resistance value of $6.7 \times 10^4$ ohms, a peripheral non-uniformity of 1.8 times, an environmental dependence of 1.2 times, a resistance retentivity of 60% as a result of the electrification deterioration, and a hardness of 66°. Image evaluation was also made in the same way as in Example 1 to find that the charging roller E was ranked as "A" for the horizontal lines attributable to charging about both the initial-stage images and the images after running, and ranked as "A" also about the evaluation on vertical-line faulty images after running.

Example 6

An unvulcanized rubber composition was prepared in the same way as in Example 2 except that the conductive agent was changed for carbon black (trade name: TOKA BLACK #7270SB; available from Tokai Carbon Co., Ltd.; pH: 7.5; volatile component: 1.0 wt. %) and was compounded in an amount of 70 parts based on 100 parts of the binder polymer. Then, a charging roller F was produced in the same way as in Example 1 except that the unvulcanized rubber composition thus obtained was used. About the charging roller F obtained, the electrical resistance, the peripheral non-uniformity of electrical resistance, the environmental dependence and the electrification deterioration were measured and also the hardness was measured, all in the same way as those in Example 1. As the result, the charging roller F was found to have an initial-stage roller resistance value of $2.5 \times 10^4$ ohms, a peripheral non-uniformity of 1.4 times, an environmental dependence of 1.1 times, a resistance retentivity of 78% as a result of the electrification deterioration, and a hardness of 82°. Image evaluation was also made in the same way as in Example 1 to find that the charging roller F was ranked as "A" for the horizontal lines attributable to charging about both the initial-stage images and the images after running, and ranked as "A" also about the evaluation on vertical-line faulty images after running.

Example 7

An unvulcanized rubber composition was prepared in the same way as in Example 6 except that the carbon black was compounded in an amount of 75 parts based on 100 parts of the binder polymer. Then, a charging roller G was produced in the same way as in Example 1 except that the unvulcanized rubber composition thus obtained was used. About the charging roller G obtained, the electrical resistance, the peripheral non-uniformity of electrical resistance, the environmental dependence and the electrification deterioration were measured and also the hardness was measured, all in the same way as those in Example 1. As the result, the charging roller G was found to have an initial-stage roller resistance value of $1.7 \times 10^4$ ohms, a peripheral non-uniformity of 1.5 times, an environmental dependence of 1.1 times, a resistance retentivity of 79% as a result of the electrification deterioration, and a hardness of 85°. Image evaluation was also made in the same way as in Example 1 to find that the charging roller G was ranked as "A" for the horizontal lines attributable to charging about both the initial-stage images and the images after running, and ranked as "B" about the evaluation on vertical-line faulty images after running.

Example 8

An unvulcanized rubber composition was prepared in the same way as in Example 2 except that the conductive agent was changed for carbon black (trade name: TOKA BLACK #3845; available from Tokai Carbon Co., Ltd.; pH: 10; volatile component: 0.4 wt. %) and was compounded in an amount of 45 parts based on 100 parts of the binder polymer. Then, a charging roller H was produced in the same way as in Example 1 except that the unvulcanized rubber composition thus obtained was used. About the charging roller H obtained, the electrical resistance, the peripheral non-uniformity of electrical resistance, the environmental dependence and the electrification deterioration were measured and also the hardness was measured, all in the same way as those in Example 1. As the result, the charging roller H was found to have an initial-stage roller resistance value of $1.3 \times 10^5$ ohms, a peripheral non-uniformity of 1.7 times, an environmental dependence of 1.2 times, a resistance retentivity of 50% as a result of the electrification deterioration, and a hardness of 65°. Image evaluation was also made in the same way as in Example 1 to find that the charging roller H was ranked as "A" for the horizontal lines attributable to charging about the initial-stage images and "B" about the images after running, and ranked as "A" about the evaluation on vertical-line faulty images after running.

Example 9

An unvulcanized rubber composition was prepared in the same way as in Example 2 except that the conductive agent was changed for carbon black (trade name: RAVEN 1255, available from Columbian Carbon; pH: 2.5; volatile component: 2.7 wt. %) and was compounded in an amount of 70 parts based on 100 parts of the binder polymer. Then, a charging roller I was produced in the same way as in Example 1 except that the unvulcanized rubber composition thus obtained was used. About the charging roller I obtained, the electrical resistance, the peripheral non-uniformity of electrical resistance, the environmental dependence and the electrification deterioration were measured and also the hardness was measured, all in the same way as those in Example 1. As the result, the charging roller I was found to have an initial-stage roller resistance value of $2.0 \times 10^5$ ohms, a peripheral non-uniformity of 1.9 times, an environmental dependence of 1.1 times, a resistance retentivity of 72% as a result of the electrification deterioration, and a hardness of 83°. Image evaluation was also made in the same way as in Example 1 to find that the charging roller I was ranked as "B" for the horizontal lines attributable to charging about both the initial-stage images and the images after running, and ranked as "A" about the evaluation on vertical-line faulty images after running.

Comparative Example 1

An unvulcanized rubber composition was prepared in the same way as in Example 1 except that the binder polymer was changed for the unmodified SBR and that the conductive agent was changed for carbon black (trade name: TOKA BLACK #7270SB; available from Tokai Carbon Co., Ltd.) and was compounded in an amount of 45 parts based on 100 parts of the binder polymer. Then, a charging roller J was produced in the same way as in Example 1 except that the unvulcanized rubber composition thus obtained was used. About the charging roller J obtained, the electrical resistance, the peripheral non-uniformity of electrical resistance, the environmental dependence and the electrification deterioration were measured and also the hardness was measured, all in the same way as those in Example 1. As the result, the charging roller J was found to have an initial-stage roller resistance value of $1.3 \times 10^5$ ohms, a peripheral non-uniformity of 2.3 times, an environmental dependence of 1.2 times, a resistance retentivity of 35% as a result of the electrification deterioration, and a hardness of 64°. Image evaluation was also made in the same way as in Example 1 to find that the charging roller J was ranked as "A" for the horizontal lines attributable to charging about the initial-stage images and "D" about the images after running, and ranked as "A" about the evaluation on vertical-line faulty images after running.

Comparative Example 2

An unvulcanized rubber composition was prepared in the same way as in Comparative Example 1 except that the binder polymer was changed for the unmodified BR. Then, a charging roller K was produced in the same way as in Example 1 except that the unvulcanized rubber composition thus obtained was used. About the charging roller K obtained, the electrical resistance, the peripheral non-uniformity of electrical resistance, the environmental dependence and the electrification deterioration were measured and also the hardness was measured, all in the same way as those in Example 1. As the result, the charging roller K was found to have an initial-stage roller resistance value of $8.0 \times 10^4$ ohms, a peripheral non-uniformity of 2.5 times, an environmental dependence of 1.2 times, a resistance retentivity of 28% as a result of the electrification deterioration, and a hardness of 62°. Image evaluation was also made in the same way as in Example 1 to find that the charging roller K was ranked as "A" for the horizontal lines attributable to charging about the initial-stage images and "C" about the images after running, and ranked as "A" about the evaluation on vertical-line faulty images after running.

The results of evaluation reported as above are summarized in Table 1.

TABLE 1

|  |  |  | Example |  |  |  |  |  |  |  |  | Comp. Ex. | |
|---|---|---|---|---|---|---|---|---|---|---|---|---|---|
|  |  |  | 1 | 2 | 3 | 4 | 5 | 6 | 7 | 8 | 9 | 1 | 2 |
|  |  |  | Elastic-material Layer Formulation | | | | | | | | | | |
|  |  |  | Binder polymer: | | | | | | | | | | |
| Modified SBR-1 |  |  | 100 | — | — | — | — | — | — | — | — | — | — |
| Modified SBR-2 |  |  | — | 100 | — | 100 | 100 | 100 | 100 | 100 | 100 | — | — |
| Modified BR-1 |  |  | — | — | 100 | — | — | — | — | — | — | — | — |
| Unmodified SBR |  |  | — | — | — | — | — | — | — | — | — | 100 | — |
| Unmodified BR |  |  | — | — | — | — | — | — | — | — | — | — | 100 |
| Carbon black | pH | Volatile comp. |  |  |  |  |  |  |  |  |  |  |  |
| TOKA BLACK #5500 | 6.0 | 1.4 | — | — | — | 28 | 30 | — | — | — | — | — | — |
| TOKA BLACK #7400 | 7.0 | 1.5 | 50 | 50 | 50 | — | — | — | — | — | — | — | — |
| TOKA BK. #7270SB | 7.5 | 1.0 | — | — | — | — | — | 70 | 75 | — | — | 45 | 45 |
| TOKA BLACK #3845 | 10.0 | 0.4 | — | — | — | — | — | — | — | 45 | — | — | — |
| RAVEN 1255 | 2.5 | 2.7 | — | — | — | — | — | — | — | — | 70 | — | — |
| Zinc oxide |  |  | 5 | 5 | 5 | 5 | 5 | 5 | 5 | 5 | 5 | 5 | 5 |
| Zinc stearate |  |  | 1 | 1 | 1 | 1 | 1 | 1 | 1 | 1 | 1 | 1 | 1 |
| Sulfur |  |  | 1.2 | 1.2 | 1.2 | 1.2 | 1.2 | 1.2 | 1.2 | 1.2 | 1.2 | 1.2 | 1.2 |
| NOCCELLER TBzTD |  |  | 1 | 1 | 1 | 1 | 1 | 1 | 1 | 1 | 1 | 1 | 1 |
| SANTOCURE TBSI |  |  | 1 | 1 | 1 | 1 | 1 | 1 | 1 | 1 | 1 | 1 | 1 |
| MD-1 hardness: (°) |  |  | 70 | 72 | 68 | 64 | 66 | 82 | 85 | 65 | 83 | 64 | 62 |
| Roller resistance: |  |  |  |  |  |  |  |  |  |  |  |  |  |
| Initial stage (Ω) |  |  | $6.7 \times 10^4$ | $8.0 \times 10^4$ | $5.0 \times 10^4$ | $1.3 \times 10^5$ | $6.7 \times 10^4$ | $2.5 \times 10^4$ | $1.7 \times 10^4$ | $1.3 \times 10^5$ | $2.0 \times 10^5$ | $1.3 \times 10^5$ | $8.0 \times 10^4$ |
| Peri. non-unif. (init. stage) (times) |  |  | 1.5 | 1.8 | 1.7 | 1.9 | 1.8 | 1.4 | 1.5 | 1.7 | 1.9 | 2.3 | 2.5 |
| Environmental dependence (times) |  |  | 1.1 | 1.1 | 1.2 | 1.2 | 1.2 | 1.1 | 1.1 | 1.2 | 1.1 | 1.2 | 1.2 |
| After electrification (Ω) |  |  | $9.5 \times 10^4$ | $1.0 \times 10^5$ | $6.8 \times 10^4$ | $2.4 \times 10^5$ | $1.1 \times 10^5$ | $3.2 \times 10^4$ | $2.1 \times 10^4$ | $2.7 \times 10^5$ | $2.8 \times 10^5$ | $3.8 \times 10^5$ | $2.9 \times 10^5$ |
| Resistance retentivity (%) |  |  | 70 | 77 | 73 | 55 | 60 | 78 | 79 | 50 | 72 | 35 | 28 |
|  |  |  | Image evaluation: | | | | | | | | | | |
| Horizontal lines attributable to charging (init. stage) |  |  | A | A | A | A | A | A | A | A | B | A | A |
| Horizontal lines attributable to charging (after run.) |  |  | A | A | A | B | A | A | A | B | B | D | C |
| Vertical lines after running |  |  | A | A | A | A | A | A | B | A | A | A | A |

In Comparative Examples 1 and 2, a great change in electrical resistance was seen between those before and after the long-term continuous electrification. Image ranking was also inferior about the horizontal lines attributable to charging after running, and the peripheral non-uniformity of electrical resistance was more than 2.0 times. In contrast thereto, in Examples 1 to 9, the peripheral non-uniformity of electrical resistance was not more than 1.9 times, the electrical resistance retentivity between those before and after the long-term continuous electrification was more than 50%, and the image evaluation was ranked as "B" or higher in all items.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-238094, filed on Oct. 15, 2009, which is here incorporated by reference herein in its entirety.

What is claimed is:

1. A charging member comprising a conductive support and an elastic-material layer, wherein
the elastic-material layer comprises a vulcanized rubber, and the vulcanized rubber is a vulcanized product of a composition which comprises
i) a binder polymer comprising a polymer having a butadiene skeleton and
ii) carbon black as an electrically conductive particle dispersed in the binder polymer;
wherein the polymer having a butadiene skeleton has a molecular terminal modified with an atomic group represented by the following general formula (1) or (2):

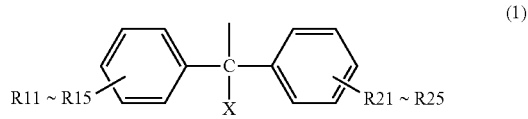

(1)

wherein X represents OH or SH, and R11 to R15 and R21 to R25 each independently represent a hydrogen atom or a monovalent substituent; or

(2)

wherein Y represents OH or SH, and R3 to R5 each represent a hydrogen atom or a monovalent substituent; and
wherein the carbon black is chemically bonded to the binder polymer.

2. The charging member according to claim 1, wherein the polymer having a butadiene skeleton is polybutadiene or a styrene-butadiene copolymer.

3. The charging member according to claim 1, wherein the polymer having a butadiene skeleton is one having been modified at a molecular terminal thereof with an atomic group represented by the following formula (5) or (6):

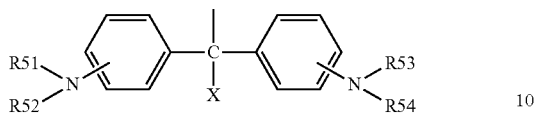

wherein R51 to R54 each independently represent a hydrogen atom or an alkyl group having 1 to 4 carbon atom(s), and X represents OH or SH; or

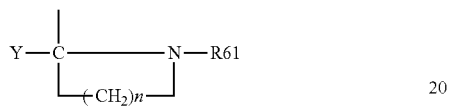

wherein Y represents OH or SH, R61 represents a hydrogen atom, an alkyl group having 1 to 6 carbon atom(s) or a phenyl group, and n represents an integer of 2 to 6.

4. An electrophotographic apparatus comprising the charging member according to claim 1 and an electrophotographic photosensitive member disposed in contact with the charging member.

* * * * *